(12) United States Patent
Carlson

(10) Patent No.: US 7,190,304 B1
(45) Date of Patent: Mar. 13, 2007

(54) SYSTEM FOR INTERCEPTION AND DEFEAT OF ROCKET PROPELLED GRENADES AND METHOD OF USE

(75) Inventor: Mark A. Carlson, Amherst, NH (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 11/010,751

(22) Filed: Dec. 13, 2004

Related U.S. Application Data

(60) Provisional application No. 60/529,446, filed on Dec. 12, 2003.

(51) Int. Cl.
- F41G 7/00 (2006.01)
- G01S 13/86 (2006.01)
- G01S 13/88 (2006.01)
- G01S 13/00 (2006.01)
- F41G 7/26 (2006.01)
- F41G 7/28 (2006.01)

(52) U.S. Cl. ............ 342/62; 342/52; 342/53; 342/61; 342/175; 342/195; 244/3.1; 244/3.11; 244/3.13; 244/3.14

(58) Field of Classification Search ......... 244/3.1–3.3; 342/52–59, 60–67, 89, 90, 175, 195; 89/1.11
See application file for complete search history.

(56) References Cited

U.S. PATENT DOCUMENTS

| | | | |
|---|---|---|---|
| 3,974,328 A * | 8/1976 | Thomas et al. ............ 244/3.17 |
| 4,103,847 A * | 8/1978 | Thomas et al. ............ 244/3.18 |
| 4,424,943 A * | 1/1984 | Zwirn et al. ............... 244/3.11 |
| 4,497,065 A * | 1/1985 | Tisdale et al. ............. 244/3.15 |
| 4,867,034 A * | 9/1989 | Trosky et al. ............... 244/3.15 |
| 5,282,013 A * | 1/1994 | Gregoris .................... 244/3.16 |
| 5,332,176 A * | 7/1994 | Wootton et al. ........... 244/3.11 |
| 5,755,400 A * | 5/1998 | Kalms, III .................. 244/3.17 |
| 5,784,156 A | 7/1998 | Nicholson |
| 5,788,178 A * | 8/1998 | Barrett, Jr. .................. 244/3.11 |
| 5,944,281 A * | 8/1999 | Pittman et al. ............. 244/3.12 |
| 6,079,665 A * | 6/2000 | Nella et al. ................. 244/3.17 |
| 6,347,762 B1 * | 2/2002 | Sims et al. .................. 244/3.17 |
| 6,369,885 B1 * | 4/2002 | Brown et al. ............... 244/3.16 |
| 6,422,508 B1 * | 7/2002 | Barnes ........................ 244/3.16 |
| 6,507,392 B1 | 1/2003 | Richards et al. |
| 6,674,520 B1 * | 1/2004 | Hicks et al. ................ 244/3.16 |
| 6,690,458 B2 | 2/2004 | Schorr |
| 6,720,907 B1 * | 4/2004 | Miron .......................... 342/62 |
| 6,870,358 B2 | 3/2005 | Alexander |
| 6,909,267 B2 | 6/2005 | Alexander |
| 6,943,873 B2 | 9/2005 | Sallee |
| 2004/0056792 A1 * | 3/2004 | Miron .......................... 342/62 |
| 2004/0125119 A1 | 7/2004 | Alexander |

* cited by examiner

Primary Examiner—Bernarr E. Gregory
(74) Attorney, Agent, or Firm—Daniel J. Long

(57) ABSTRACT

A method for intercepting and a defeating rocket propelled grenade (RPG) which includes the steps of detecting a thermal signature from a launch of the RPG; and cueing a narrow beam radar which locates the RPG and develops a ballistic solution and target intercept point for intercepting the PPG with an intercept vehicle.

1 Claim, 3 Drawing Sheets

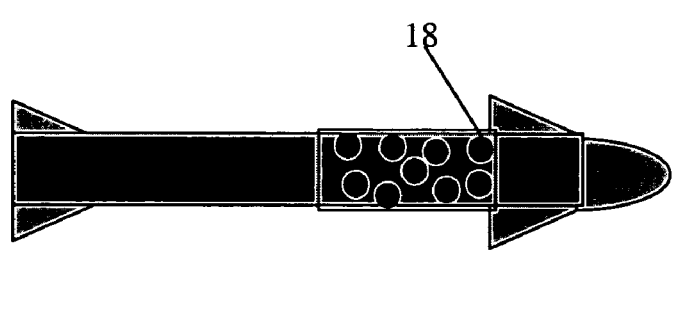
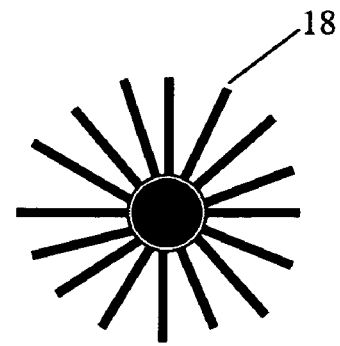
Figure 3(a)                    Figure 3(b)
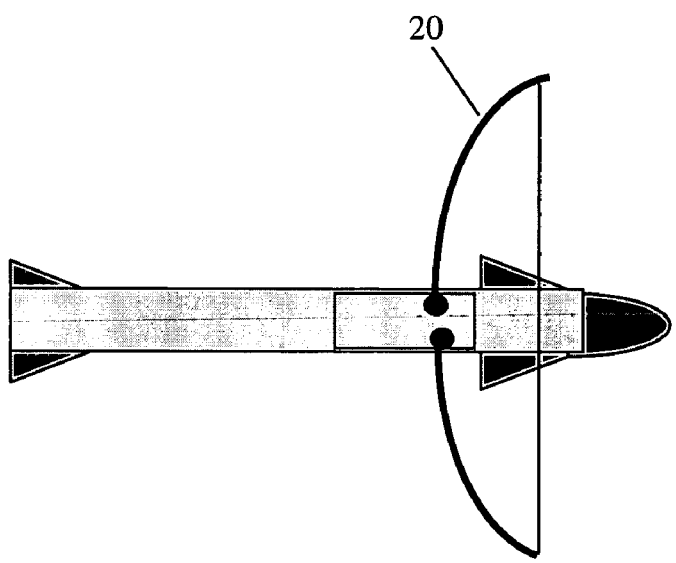
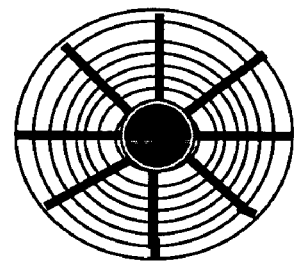
Figure 4(a)                    Figure 4(b)

SYSTEM FOR INTERCEPTION AND DEFEAT OF ROCKET PROPELLED GRENADES AND METHOD OF USE

CROSS REFERENCE TO RELATED APPLICATION

This applications claims rights under 35USC§119e) from U.S. application Ser. No. 60/529,446 filed Dec. 12, 2003.

BACKGROUND OF THE INVENTION

1. Field of the Invention

The present invention relates to countermeasures against missiles and more particularly to countermeasures which are useful against a rocket propelled grenade (RPG).

2. Brief Description of Prior Developments

The current situation in the Iraq/Afghanistan theater of operations presents a significant threat to US military forces due to ground attack by RPG's. The threat is no longer constrained to attacks on ground vehicles, but airborne and waterborne craft.

A need, therefore, exists for a system and method for the detection, interception, and countermeasure of a shoulder fired RPG's at airborne, ground, and water vehicles in a cost effective manner using predominantly existing, mature, systems and technology.

SUMMARY OF INVENTION

The system and method of this invention combines elements of existing systems using a system concept approach. Detection of the initial launch of an RPG utilizes elements of micro-balometer technology and a low cost radar which provides the front end of the system. The microbalometers detect the thermal signature of the launch and provide the location of the sector in space from where the RPG launch originated. This information is then utilized to cue the narrow beam radar which then locates the RPG and develops the ballistic solution and target intercept point which is provided to the ATIRCM suite and the intercept vehicle and launcher.

Three options are available with respect to the second step of developing the ballistic solution and target intercept point. The first option is a purely ballistic solution wherein the intercept vehicle containing the RPG countermeasure is launched on a solely ballistic intercept and the radar monitors the engagement and sends the cue to deploy the intercept vehicle RPG countermeasure through a pre-established uplink thus effecting the countermeasure of the RPG. The second option is one in which the intercept vehicle is launched on a ballistic trajectory and steering commands are generated through an updated radar solution of the engagement and sent to the missile through the pre-established uplink in order to optimize the countermeasure effectiveness through trajectory shaping. The third option is one in which the CMWS/ATIRCM serves as the launch designator and guides a version of the intercept vehicle which incorporates existing guidance technology based on the LCPK/APKWS manufactured by BAE SYSTEMS Information and Electronic Systems Integration Inc. to the intercept of the RPG and described in U.S. Pat. Nos. 5,784,156; 6,507,392; and 6,690,458 and U.S. patent publications U.S. Pat. Nos. 6,943, 873-B2; 6,909,267-B2; 6,870,358-B2; 20040125119-A1, filed Jul. 25, 2003; and 20040156457-A1, filed Jul. 25, 2003, the contents all of which are incorporated herein by reference, at which point an uplinked command to the intercept vehicle causes deployment of the countermeasure. Guidance of the intercept vehicle may differ based upon which method of control is utilized. For the ballistic intercept vehicle solution, the intercept vehicle is launched on a ballistic intercept based on the Radar solution of the incoming trajectory. The intercept vehicle is a stabilized platform with thrust profile designed to optimize momentum at the time of terminal engagement in order to provide an optimum RPG countermeasure when the intercept vehicle RPG countermeasure, payload, is deployed. The intercept vehicle contains steering surfaces in order to enable minor course corrections to be made through the uplink to the missile based on a continually updated Radar solution of the engagement. The third intercept vehicle is based upon guidance using the ATIRCM as the designator with a modified version of the LCPK/APKWS seeker installed as the front end of the intercept vehicle. The detonation command to the intercept vehicle to deploy the RPG countermeasure is through the Radar guidance control uplink.

Three types of RPG countermeasure warheads are available as options and are discussed below. These are common regardless of which type of guidance is selected for control of the engagement.)

Three different intercept vehicle payloads may be used, i.e. overpressure based, directed pressure wave detonated on command by the central processing unit through either timing based on the ballistic solution, or specific command through then uplink to the intercept vehicle. This approach significantly alters the RPG trajectory away from the intended target, second, expanding rigid net approach. Expanding net formed using an existing spring-rod type device known by the trade name of "Stacer" which forms an extended rigid net which either alters the RPG trajectory through collision or causes premature detonation of the RPG warhead through direct contact with the fuse elements. Soft net deployed on command of the central processing unit immediately prior to RPG intercept. Two versions of the net are available. The first is erected and held in place using "stacer" elements which deploy the fabric net. The net is composed of a high strength material, either Arimid or metallic based, and serves to entangle the RPG, the combined momentum and altered center of gravity serving to disrupt the trajectory to induce a miss of the intended target. The final payload design incorporates a rigid link expanding to form a geodesic dome which serves to capture the RPG. The combined momentum disrupts the trajectory generating a miss of the intended target or premature detonation of the RPG itself.

BRIEF DESCRIPTION OF THE DRAWINGS

The invention is further described in the accompanying drawings wherein:

FIGS. 3(*a*) and (*b*) are respective schematic drawings showing another preferred alternate embodiment of the system of the present invention;

FIGS. 4(a) and (b) are respectively schematic side elevation and front view drawings showing another alternate preferred embodiment of the system of the present invention.

DETAILED DESCRIPTION OF THE PREFERRED EMBODIMENT

Figure 1:
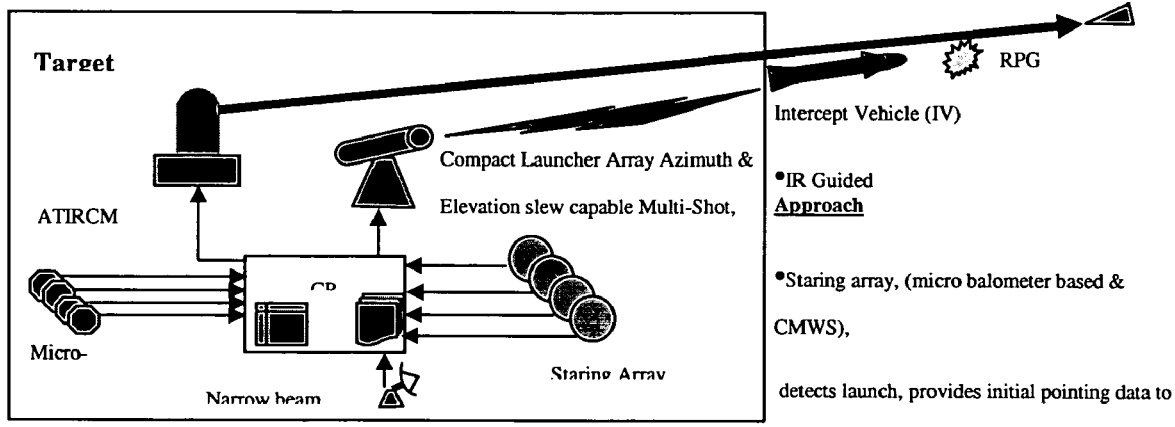
FIG. 1 is a schematic drawing showing a preferred embodiment of the system of the present invention.
Figure 2:
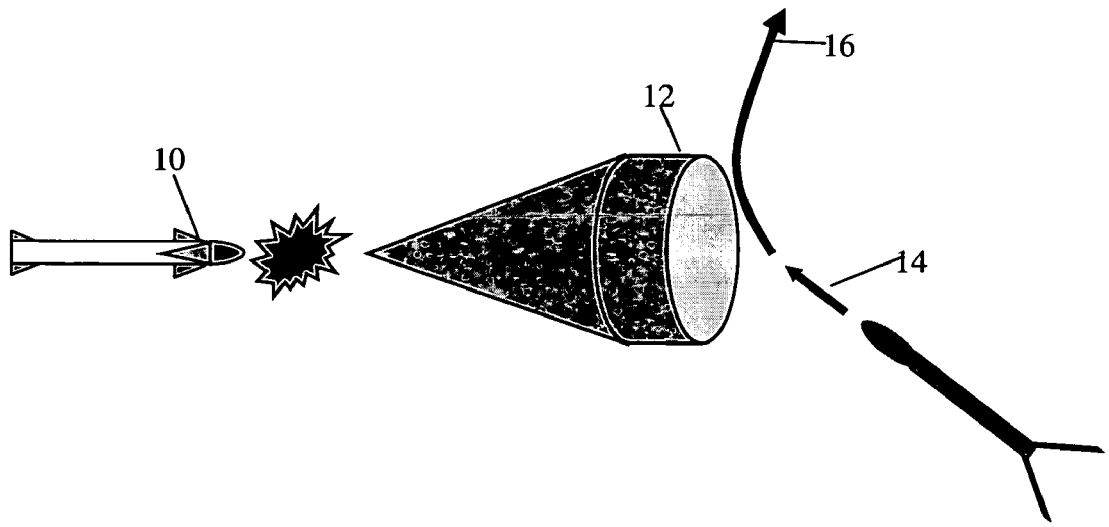
FIG. 2 is a schematic side elevation and front view drawing showing an alternate preferred embodiment of the system of the present invention.

Referring to FIG. 1 in the first embodiment of this invention, the approach is to intercept and disrupt RPG round early in trajectory (fly out). In this figure there is shown a shape charge warhead 10, an over-pressure wave front 12, the PPG ballistic trajectory 14 and the RPG trajectory post detonation 16. As is shown in Table 1, typical time from shoot to hit for RPG ranges between 1 and 3 seconds for the proposed engagement geometry. Preliminary allocation of CM time line based on a threshold value of 2 sec and a goal of 1 sec can be used to estimate approach viability/develop functional requirements.

TABLE 1

| Function | Threshold | Goal |
| --- | --- | --- |
| Detect | 0.400 | 0.200 |
| Develop Ballistic Track | 0.100 | 0.050 |
| Point Laser/Acquire | 0.300 | 0.150 |
| Calculate Intercept | 0.200 | 0.100 |
| Point Launcher | 0.300 | 0.150 |
| Launch & Intercept | 0.600 | 0.300 |
| Detonate Interceptor | 0.010 | 0.050 |

The system concept relies on proven, existing, technologies for high risk elements. This system reduces development to several functional pieces only. Portions of that technology have been developed in part further reducing risk.

Two potential solutions to rocket guidance (auto-pilot) exist. A know warhead known as Hydra 70 with LCPK mid-body guidance package allow an existing vehicle which could be adapted to a new payload replacing the current warhead. Payload would be designed along lines of the concepts described herein. This approach may be mainly used to overpressure approach due to dynamic pressure (structural) limitations on alternate IV implementation concepts.

New rocket development is provided to meet fly out demands. It is compatible with any payload and tailored to minimize structural considerations, guidance is possible immediately. It is compatible with LCPK mid-body guidance package.

Two types of intercept vehicles can be developed in either un-guided or guided variants. IV fusing will require either an internal timer or signal from CPU via up-link. The possibility exists of using switch taking advantage of laser designation. Trajectory disruption occurs through indirect blast (over pressure), or expanding link/net. IV payload initiated in proximity, (prior to passage), of inbound grenade. As a first option a pressure front may be used to tip grenade from an intended flight path. The CEP required may be small. This approach dictates tight tolerance on guidance problem to navigate within close enough proximity for blast to be effective. Detonation timing is critical. Up-link required to fuse. Specific engagement geometry will be required. The shaped pressure front as, for example, is used in the known Hydra 70 warhead modification may increase effectively.

In this first option, the IV payload relies on blast overpressure to "tip" oncoming RPG from flight path. The shaped pressure front (including fragments) detonated at specific TTG to knock an RPG from ballistic path. It requires specific engagement geometry to optimize energy direction in order to "tip" an RPG which places higher demand on guidance and navigation solution and may affect auto-pilot design and may create specific fusing problem and potential need for uplink commands.

Referring to FIGS. 3(a) and (b) as a second option, IV payload used to increase effective diameter through expanding net approach. This second option includes three sub-variants. The first sub-variant is an expanding rod which is multiple Stacer rod elements as at 18 expand to form blockage in direct line with RPG. It knocks the RPG from ballistic path. The Stacer rod diameter can be 6–10 ft increasing probability of intercept. Larger diameters require more rods due to tip-tip gap increase. Rod rigidity may be insufficient to sustain bending induced upon collision with RPG. Initial calculations on bending stress indicate potential materials incompatibility. Metal Stacer rod element contact with piezo-electric fuse elements promote RPG detonation.

Referring to FIGS. 4(a) and (b), a net approach includes a payload consisting of a stowed cable net assembly 20 deployed to capture an RPG which snares the RPG by queued deployment of net assembly using Stacer elements to raise net. Timing is critical such that minimum momentum is bled off due to rapid deceleration which ensues after deployment of net. The combined momentum and altered cg disrupt trajectory. The best approach to minimizing fusing probability. The non-magnetic materials are potentially available for the net. Reduced number of Stacers required to support net decreasing probability of metal to metal contact with piezo-electric fuse on RPG.

Figure 5A:
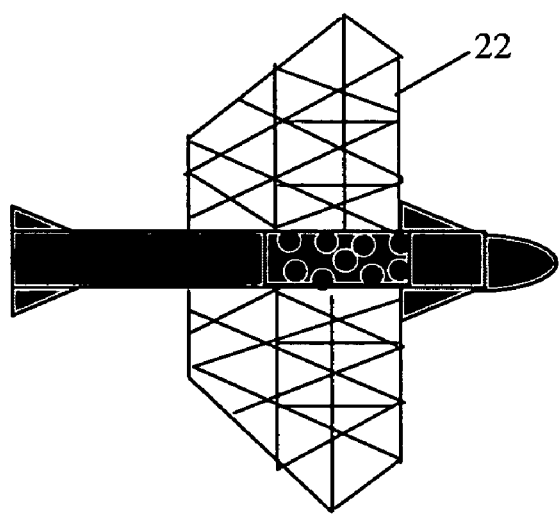
FIGS. 5(a) and (b) are respectively side elevation and front view schematic drawings showing a preferred embodiment of another alternate embodiment of the system of the present invention.
Figure 5B:
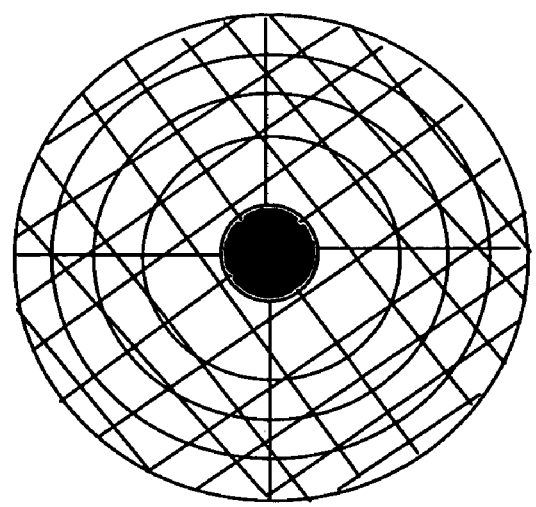

Referring to FIGS. 5(a) and (b) an "expanding link" approach involves a payload consists of stowed rigid link assembly 22 which, when deployed, forms a geodesic dome to capture RPG. This element expands to block and capture RPG round. Combined momentum disrupts combined trajectory similar to net design. Potentially lower drag than "net" variant involves higher risk of fusing due to use of metallic components. Due to the link and pin nature of structure, tendency to form an "egg" shape when immersed in moderate/high slipstream.

The proposed approach enables the user to countermeasure RPG's from extended ranges into close proximity to the intended target at which point alternate countermeasures could be applied. The approach capitalizes on existing technology for most of the necessary functions, incorporating low cost elements for the detection and cueing portions of the mission. The intercept vehicle concept leverages existing guidance and aerodynamic technology into the active portion of the countermeasure suite and incorporates novel methods for ensnaring and disrupting the RPG trajectory.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. In a method for intercepting and defeating a rocket propelled grenade (RPG) comprising the steps of:
   (a) detecting a thermal signature from a launch of the RPG; and
   (b) cueing a narrow beam radar which locates the RPG and develops a ballistic solution and target intercept point for intercepting the RPG, wherein the improvement comprises engaging the RPG with an intercept vehicle by means of rods or a net assembly.

* * * * *